United States Patent [19]
Nawata

[11] Patent Number: 5,072,445
[45] Date of Patent: Dec. 10, 1991

[54] TDMA SATELLITE COMMUNICATIONS SYSTEM OPERATING IN WIDE AND NARROW APERTURE MODES FOR RECEIVING BURSTS OF VARIOUS TIMING DEVIATIONS

[75] Inventor: Hizuru Nawata, Tokyo, Japan

[73] Assignee: NEC Corporation, Japan

[21] Appl. No.: 443,737

[22] Filed: Nov. 30, 1989

[30] Foreign Application Priority Data

Dec. 1, 1988 [JP] Japan .............................. 63-305232

[51] Int. Cl.$^5$ ............................................. H04J 3/06
[52] U.S. Cl. ................................ 370/104.1; 375/109; 370/103
[58] Field of Search .................... 370/104.1, 95.3, 103; 455/12; 375/109, 114

[56] References Cited

U.S. PATENT DOCUMENTS

| | | | |
|---|---|---|---|
| 3,789,142 | 1/1974 | Shimasaki et al. | 455/12 |
| 4,800,560 | 1/1989 | Aoki et al. | 370/104.1 |
| 4,872,164 | 10/1989 | Rieger | 370/104.1 |

Primary Examiner—Douglas W. Olms
Assistant Examiner—Wellington Chin
Attorney, Agent, or Firm—Laff, Whitesel, Conte & Saret

[57] ABSTRACT

In a satellite communications system, a time slot assignment signal and a reference timing signal are transmitted from a central station to terminal stations to allow them to send bursts on assigned time slots and to establish the frame timing. In the central station, first and second self-resettable counters increment their respective binary counts at clock intervals and reset their counts to an initial value at time-slot intervals. A local timing signal is generated synchronously with the reference timing signal and delayed by an amount corresponding to a minimum round-trip propagation delay to reset the first counter. In an initial, wide aperture mode, the output of the first counter is used to generate control signals for recovering a carrier and clock and widely opening an aperture gate for detecting unique words of a burst that is affected by satellite drift. If a unique word is detected, the central station switches to a narrow aperture mode in which the output of the second counter is used instead to generate control signals for recovering the carrier and clock and narrowly opening the gate to reduce the possibility of detecting false unique words. In a preferred embodiment, the output of the second counter is stored in a memory in response to the detection of a unique word and an average value of the stored counts is derived to optimize the reset timing of the second counter.

9 Claims, 5 Drawing Sheets

TDMA SATELLITE COMMUNICATIONS SYSTEM OPERATING IN WIDE AND NARROW APERTURE MODES FOR RECEIVING BURSTS OF VARIOUS TIMING DEVIATIONS

BACKGROUND OF THE INVENTION

The present invention relates generally to time-division multiple access satellite communications systems, and more particularly to a technique to be employed by a central station of the TDMA system to receive a burst from terminal stations with a large timing deviation resulting from a satellite drift in orbital position and subsequent bursts arriving at times deviating by small amounts due to variabilities of the operating parameters of the terminal stations.

In the central earth station of a TDMA satellite communications system, the demodulator includes a carrier and clock recovery circuit, which is required to accommodate variabilities between successive bursts received from different terminal stations in a short period of time. These variabilities include carrier frequency deviations, level deviations, clock deviations and burst timing deviations. Control signals are generated at time slot intervals for the carrier and clock recovery circuit, including a resetting signal for initializing the recovery circuit before the arrival of each burst, a gating pulse for detecting an unmodulated signal appended to the header of each burst, and an aperture gating pulse for unique word detection. Since the arrival of a first burst after the period of no bursts may differ significantly from the instant which can be expected from the reference timing of the central station due to a satellite drift in orbital position, the timing at which the control signals are generated for the recovery circuit must be corrected according to the deviation of the round-trip propagation delay of the satellite communications system.

According to the technique currently employed in a satellite communications system, the central station sends a burst to all terminal stations in a broadcast mode by containing in it a time-slot assignment signal which assigns time slots to terminal stations having a message to transmit and a reference timing signal to allow the sending stations to establish the frame timing. The central station is provided with a telemetry circuit which includes a demodulator to receives its own burst returning from the satellite during the broadcast mode, a timing circuit that extracts the timing signal from the received burst and a framing circuit to establish the frame timing. A counter is provided which increments a binary count at clock intervals and resets it in response to the output of the framing circuit. The output of the counter is supplied to a control signal generator which generates control signals for application to the carrier and clock recovery circuit. Since the time slot position of the received burst offsets from the extracted timing signal by an amount corresponding to the satellite drift, the resetting of the counter is brought into correct timing relationship with the returning burst.

However, the telemetry circuit requires a separate frequency converter and must be duplicated for system reliability. Furthermore, the duplicated system requires protection switching circuitry, thus adding to the complexity and cost of the central station equipment.

SUMMARY OF THE INVENTION

It is therefore an object of the present invention to provide a satellite communications system in which the central station corrects timing variations due to satellite drift without the need to receive its own burst during the broadcast mode.

The central earth station of the present invention transmits a time slot assignment signal and a reference timing signal to the terminal stations via a satellite channel to allow the terminal earth stations to send bursts on time slots specified by the assignment signal and establish a timing reference for timing the bursts. The central station includes a detector for detecting the bursts from the terminal stations, a carrier and clock recovery circuit to recover a carrier and clock pulses from the output of the detector, and a unique word detector for detecting a unique word contained in the detected burst.

According to the present invention, the central earth station comprises a timing circuit for synchronously generating a local timing signal with the reference timing signal which is transmitted to the terminal stations, and a delay circuit for introducing a delay to the local timing signal by an amount corresponding to the minimum round-trip propagation delay. In response to the delayed local timing signal, the carrier and clock recovery circuit is controlled to recover the carrier and clock pulses from a first arrived burst and a wide aperture gating pulse is generated to detect an output signal from the unique word detector in the presence of the wide aperture gating pulse. In response to the output signal of the unique word detected during the wide aperture gating pulse, the carrier and clock recovery circuit is controlled to recover said carrier and clock pulses from a subsequent incoming burst and a narrow aperture gating pulse is generated to detect an output signal from the unique word detector in the presence of the narrow aperture gating pulse.

Specifically, a first counter is provided for incrementing a first binary count at clock intervals, automatically resetting the count to an initial value at time-slot intervals, and further resetting the count in response to the delayed local timing signal. A first control signal generator is responsive to the first binary count for generating a first control signal for controlling the carrier and clock recovery circuit and generating a wide aperture gating pulse. A second counter increments a second binary count at clock intervals and resets it to an initial value at the time-slot intervals. A second control signal generator is responsive to the second binary count for generating a second control signal for controlling the carrier and clock recovery circuit and generating a narrow aperture gating pulse. An aperture gate is connected to the output of the unique word detector for passing an output signal therefrom to the second counter as an external reset pulse if the output of unique word detector coincides with either a wide or narrow aperture gating pulse supplied from a selector. The selector has a first position which couples the first control signal to the carrier and clock recovery circuit and the wide aperture gating pulse to the aperture gate and a second position which couples the second control signal to the carrier and clock recovery circuit and the narrow aperture gating pulse to the aperture gate. A control circuit initially causes the selector to switch to the first position to operate the central station in a wide aperture mode and switches it to the second position in response to an output from the aperture gate for narrow aperture mode. When no output appears subsequently at the output of the aperture gate, the control circuit switches the selector back to the first position.

According to a modified form of the present invention, the central station additionally includes a memory having a plurality of storage locations for storing the second binary count into one of the locations in response to each output of the aperture gate. A unique word counter is provided for counting the output of the aperture gate to produce a count representing the number of unique words that occur during an aperture defined either by the wide or narrow aperture gating pulse. A comparator generates an equality pulse when the second binary count equals a reference value which is normally set at the maximum value of the second counter. An average value of the second binary counts stored in the locations of the memory is derived when the unique word representative count reaches a predetermined value and the reference value of the comparator is switched to the average value. Upon coincidence between the second binary count and the average value, the comparator produces an equality pulse which is applied to the second counter as a reset pulse. The selector, which is initially switched to the first position, is switched to the second position in response to the equality pulse.

A time slot counter may be provided for counting the aperture gating pulses supplied to the gate to produce a count representing the number of time slots. The selector is switched back to the first position when the time slot representative count reaches a second predetermined value before the unique word representative count reaches the first-mentioned predetermined value, the second predetermined value being greater the first predetermined value.

BRIEF DESCRIPTION OF THE DRAWINGS

The present invention will be described in further detail with reference to the accompanying drawings, in which.

DETAILED DESCRIPTION

Figure 1:
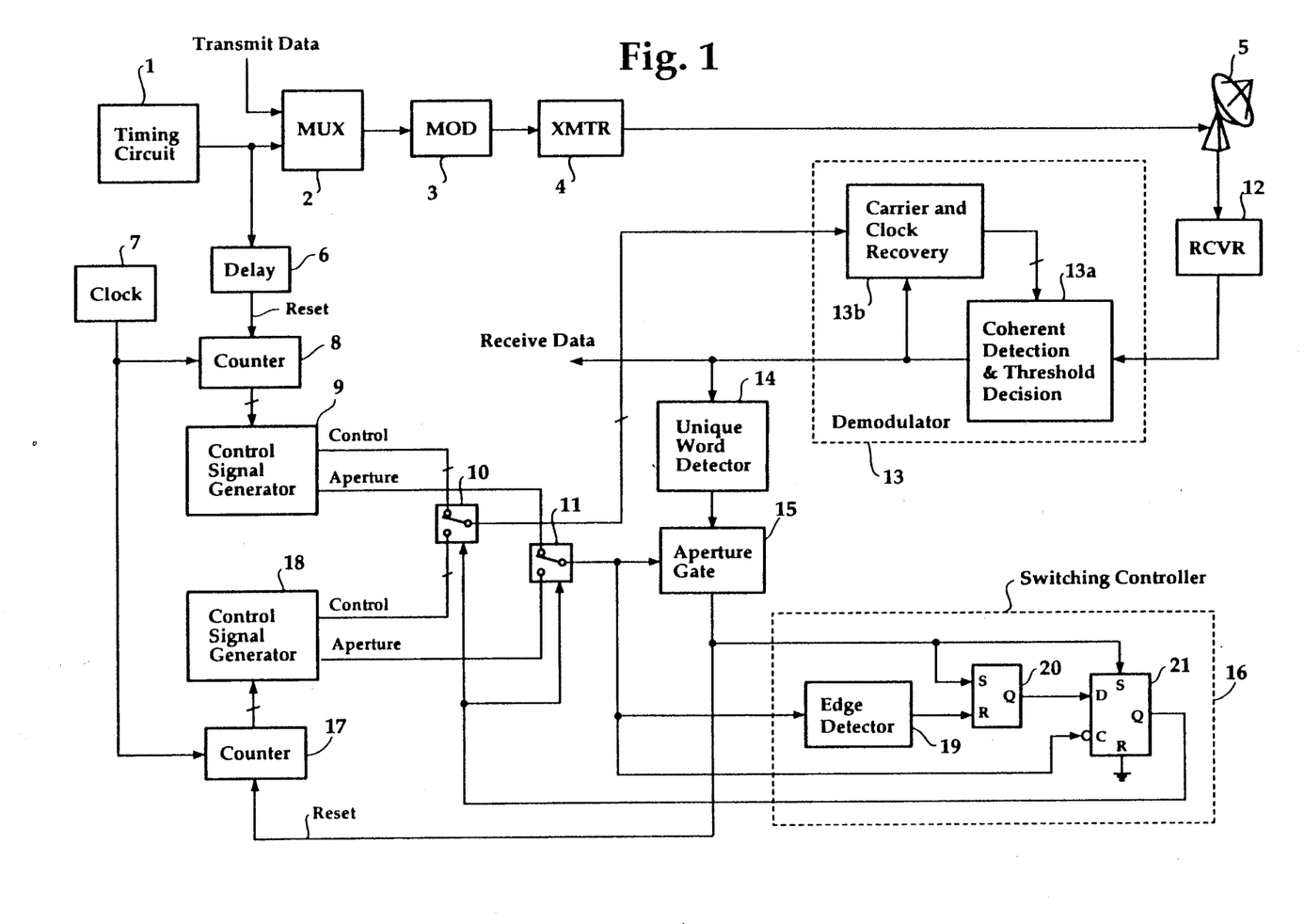
FIG. 1 is a block diagram of a central earth station of a satellite communications system according to a first embodiment of the present invention.

Referring now to FIG. 1, there is shown a central earth station of a satellite communications system according to an embodiment of the present invention. The satellite communications system includes a plurality of remote terminal stations. The central station transmits burst signals to a satellite on a geosynchronous orbit which relays the signals from the central station to the terminal stations in a broadcast mode. The central station waits for burst signals sent via the satellite from the terminal stations on a time-division multiple access mode.

The transmit section of the central station includes a timing circuit 1, a multiplexer 2, a modulator 3 and a high frequency transmitter 4 cascaded to an earth station antenna system 5. Transmit data signals are time-division multiplexed by the multiplexer 2 with a reference timing signal and a slot assignment signal which are supplied from timing circuit 1 and the multiplexed signals are digitally modulated upon a carrier. After uplink-frequency translation and power amplification by transmitter 4, the signals are sent to the antenna system 5 for transmission to a satellite transponder. Upon receipt of the signal from the central station, terminal stations extract the reference timing signal from the received signal to establish the frame timing and examines the slot assignment signal to determine to which time slots they are assigned. If there is a message to transmit, a sending station transmits it in burst form on a time slot specified by the assignment signal.

A local timing signal is also generated by the timing circuit 1 synchronously with the transmitted reference timing signal and applied to a delay line 6 where it is delayed for an interval corresponding to the minimum of all possible round-trip propagation delays of the satellite communications system which will occur due to satellite drift in its position.

Self-resettable counters 8 and 17 are driven by a clock source 7 to continuously increment their binary counts until they reach a predetermined value, whereupon the count values are reset to zero to increment their counts. The interval between successive reset times of counters 8 and 17 corresponds to the duration of a time slot in which each of the terminal stations is allowed to send its message. Therefore, counters 8 and 17 recycle their counts at time-slot intervals. Each of these counters is also initialized by a reset signal supplied from externals sources. The delayed local timing signal from delay line 6 is the external reset signal of counter 8 so it reinitiates incrementing its count from the instant which coincides with the arrival of a burst from a terminal station. The output of counter 8 is translated by a control signal generator 9 to generate control signals necessary for the recovery of a carrier and clock timing and further generate a wide aperture gating pulse for the detection of a unique word.

The incoming burst signal is detected by the antenna 5 and passed through a receiver 12 for amplification and frequency conversion to a demodulator 13 which includes a coherent detection and threshold detection circuit 13a and a carrier and clock recovery circuit 13b. The control signals from generator 9 are applied through the upper position of a selector 10 to the carrier and clock recovery circuit 13b to permit it to recover a replica of the carrier employed in the terminal stations' modulators and clock pulses for application to the coherent detection and threshold decision circuit 13a.

The output of demodulator 13 is applied to a unique word detector 14 as well as to utilization circuitry, not shown. Unique word detector 14 produces an output when it detects a unique word contained in the preamble of each burst following the carrier and clock recovery sequence.

The wide aperture gating pulse from generator 9 has a duration sufficient to cover the maximum range of all possible variations of the round-trip propagation delay which are expected in the satellite communications system and is applied through the upper position of a selector 11 to an aperture gate 15. If the output of the unique word detector 14 occurs within the period of the wide aperture, it is passed to a switching controller 16 as well as to counter 17. As will be described, switching controller 16 operates the selectors 10 and 11 in response to the outputs of selector 11 and aperture gate 15.

The binary output of counter 17 is applied to a second control signal generator 18 to generate control signals necessary for the recovery of the carrier and clock similar to the control signals generated by the first control signal generator 9 and a narrow aperture gating pulse necessary for the detection of unique words. The control signals from generator 18 are applied through the lower position of selector 10 to the carrier and clock recovery circuit 13b in a manner similar to the control signals supplied from the generator 9. The narrow aperture gating pulse from generator 18 has a duration which covers twice the guard time between successive bursts in order to accommodate their possible timing errors. The narrow aperture gating pulse is applied through the lower position of the selector 11 to the aperture gate 15.

Figure 2:
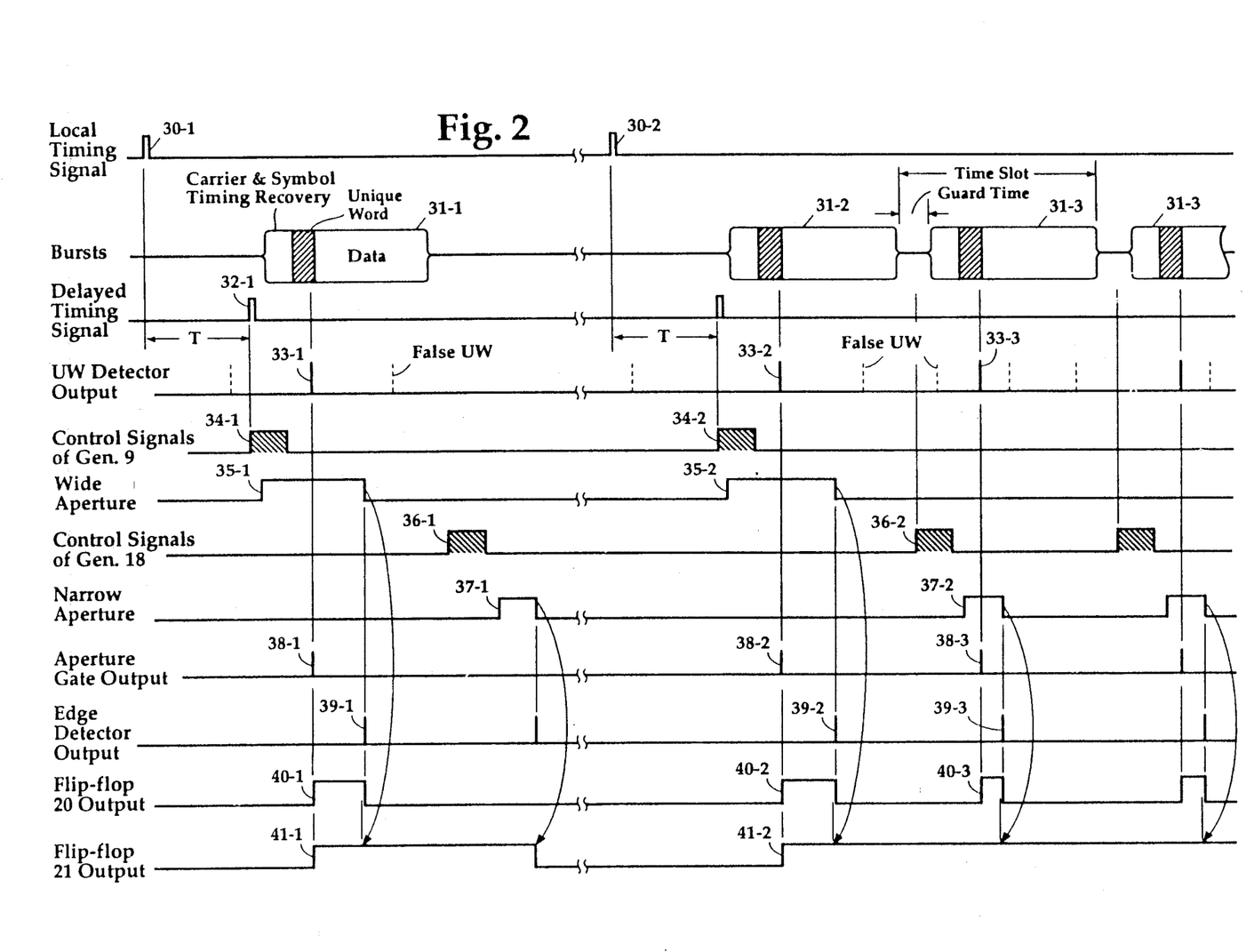
FIG. 2 is a timing diagram associated with the first embodiment.

The operation of the embodiment of FIG. 1 will be better understood with reference to a timing diagram shown in FIG. 2. If all terminal stations have no messages to transmit, unique word detector 14 produces no output, and hence, the selectors 10 and 11 remain switched to their upper position. Therefore, in response to each of the local timing signals generated by the timing circuit 1, the recovery-sequence control signals and wide aperture gating pulses are generated by the control signal generator 9 to be used for the recovery of carrier and clock from a burst sent from a terminal station and for the detection of a unique word contained in that burst. Due to the wide aperture gating pulse, the unique word of such a burst can be detected even though it has undergone a large timing deviation due to satellite drift.

If a burst 31-1 is transmitted from a terminal station in an assigned time slot in response to a reference timing signal sent synchronously with a local timing pulse 30-1 from the central station, a unique word contained in that burst is detected by the unique word detector 14. A unique-word detect pulse 33-1 appears at the output of unique word detector 14 and is passed through aperture gate 15 if it coincides with a wide aperture gating pulse 35-1, from generator 9. This gating pulse is generated in response to a local timing pulse 32-1 from delay circuit 6 which is delayed by an interval T corresponding to the minimum round-trip propagation delay with respect to the local timing signal 30-1. The unique-word detect pulse 33-1 is and applied as a reset pulse 38-1 to counter 17 as well as to switching controller 16. Counter 17 is thus conditioned to initiate incrementing its binary count from zero count value. Concurrently, carrier and timing recovery control signals 34-1 from generator 9 are supplied to the recovery circuit 13b through selector 10. Such control signals include a carrier window pulse for burst acquisition and a reset pulse for resetting phase-locked loops included in the carrier and clock recovery circuit 13b.

Switching controller 16 includes an edge detector 19, and flip-flops 20 and 21. Edge detector 19 is responsive to each edge transition of an aperture gating pulse supplied from either of the generators 9 and 18 to generate a pulse which resets the flip-flop 20, which has been set in response to the output of the aperture gate 15. The output of gate 15 is further applied to the set input of flip-flop 21, whose data input is connected to the output of flip-flop 20 and whose negative clock input is coupled to the output of selector 11. The output of flip-flop 21 is connected to the control inputs of selectors 10 and 11.

In response to the reset pulse 38-1 from aperture gate 15, flip-flops 20 and 21 are set, establishing the leading edge of pulses 40-1 and 41-1, respectively. At the trailing edge of the wide aperture 35-1, edge detector 19 produces an edge-detect pulse 39-1 which resets flip-flop 20, defining the trailing edge of the pulse 40-1. Since the logic-1 from flip-flop 20 is still present at the data input of flip-flop 21 when pulse 39-1 appears at the negative clock input, the output of flip-flop 21 remains high.

Selectors 10 and 11 are, therefore, switched to the lower position, coupling recovery-sequence control signals 36-1 and a narrow aperture gating pulse 37-1 from the control signal generator 18 to the carrier and clock recovery circuit 13b and aperture gate 15, respectively. By the narrowing of the aperture gate 15, the probability of detecting false unique words is reduced for subsequent unique word detection. Thereafter, the demodulator operates in a narrow aperture mode in which it is not necessary to take into account the variations of the round-trip propagation delay. During this mode, the timing errors between successive incoming bursts are the only concern to be taken into consideration. However the timing errors between successive bursts are much smaller than the timing variations due to the satellite drift in its position.

If there is no burst that immediately follows the first burst 31-1 as illustrated in FIG. 2, no unique-word detect pulse is produced and the data input of flip-flop 21 is low at the trailing edge of the narrow aperture 37-1. Flip-flop 21 thus switches to logic-0, defining the trailing edge of the selector switching pulse 41-1. In this way, selectors 10 and 11 are switched back to the upper position to use the outputs of control signal generator 9 in preparation to receive the next burst which is likely to have a wide range of propagation delay variations.

If a series of bursts as shown at 31-2, 31-3 and 31-4 are received in response to the transmission of the next timing signal 30-2, a series of events occur in response to burst 31-2 in a manner similar to those that occurred in response to burst 31-1. Specifically, control signals 34-2 and a wide aperture 35-2 are generated for detecting the unique word of burst 31-2 as a pulse 33-2 which is passed through aperture gate 15 as a pulse 38-2, setting the leading edge of pulses 40-2 and 41-2 at the outputs of flip-flops 20 and 21, narrowing the width of the aperture by a narrow aperture gating pulse 37-2 to reduce the likelihood of false unique words being detected. An edge detector output 39-2 defines the trailing edge of the flip-flop 20 output 40-2 at the trailing edge of wide aperture 35-2.

Due to the presence of burst 31-3 which is spaced a guard time from the preceding burst 31-2, the unique word of burst 31-3 is detected, producing a pulse 33-3 which is passed through the narrowed aperture gate 15 as an output pulse 38-3 to define the leading edge of an output pulse 40-3 from flip-flop 20. Pulse 40-3 terminates in response to an edge-detect pulse 39-3 that is produced at the trailing edge of a narrow gating pulse 37-2. At this trailing edge, the pulse 40-3 is still present at the data input of flip-flop 21 and the latter remains in the logic-1 state to continue operating the demodulator in a narrow aperture mode. Therefore, the switching controller 16 initially sets the selectors 10 and 11 to their upper position, switches them to the lower position in response to an output from aperture gate 15, and switches them back to the upper position depending on the timing of each of the wide and narrower aperture gating pulse if no output subsequently appears at the output of the gate 15.

Figure 3:
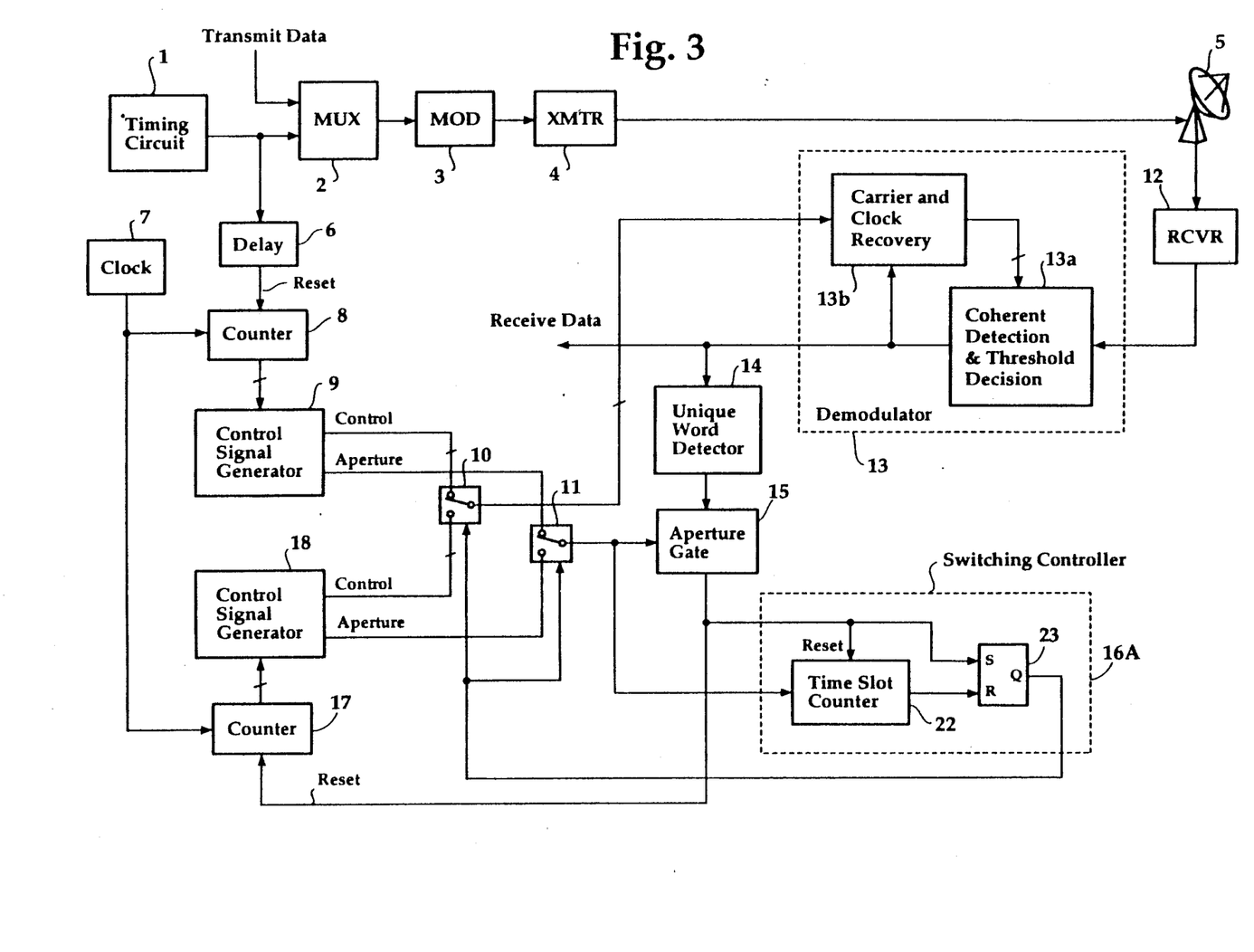
FIG. 3 is a block diagram of a modified embodiment of the invention.

FIG. 3 is a block diagram of a modified embodiment of the invention in which parts corresponding to those in FIG. 1 are marked with the same numerals as used in FIG. 1. In this embodiment, the switching controller 16 of FIG. 1 is replaced with a switching controller 16A which comprises a time slot counter 22 and a flip-flop 23. Time slot counter 22 is reset in response to the output of aperture gate 15 to start counting the output of selector 11 to produce an output when a predetermined count is reached. Since the number of aperture gating pulses at the output of selector 11 represents the number of time slots, the appearance of an output from counter 22 indicates that a predetermined number of time slots has been counted from the time it is reset. The output of counter 22 is supplied to the reset input of flip-flop 23, to the set input of which the output of aperture gate 15 is applied. The output of flip-flop 23 thus switches to a logic-1 state if an output pulse from detector 14 is gated through gate 15 to flip-flop 23. The logic-1 output of flip-flop 23 causes the selectors 10 and 11 to be switched to the lower position so that the central station enters a narrow aperture mode. If unique words are not detected for a certain period of time due to the absence of incoming bursts, time slot counter 22 will produce an output, resetting the flip-flop 23. Selectors 10 and 11 are switched back to the upper position for a wide aperture mode of operation.

Figure 4:
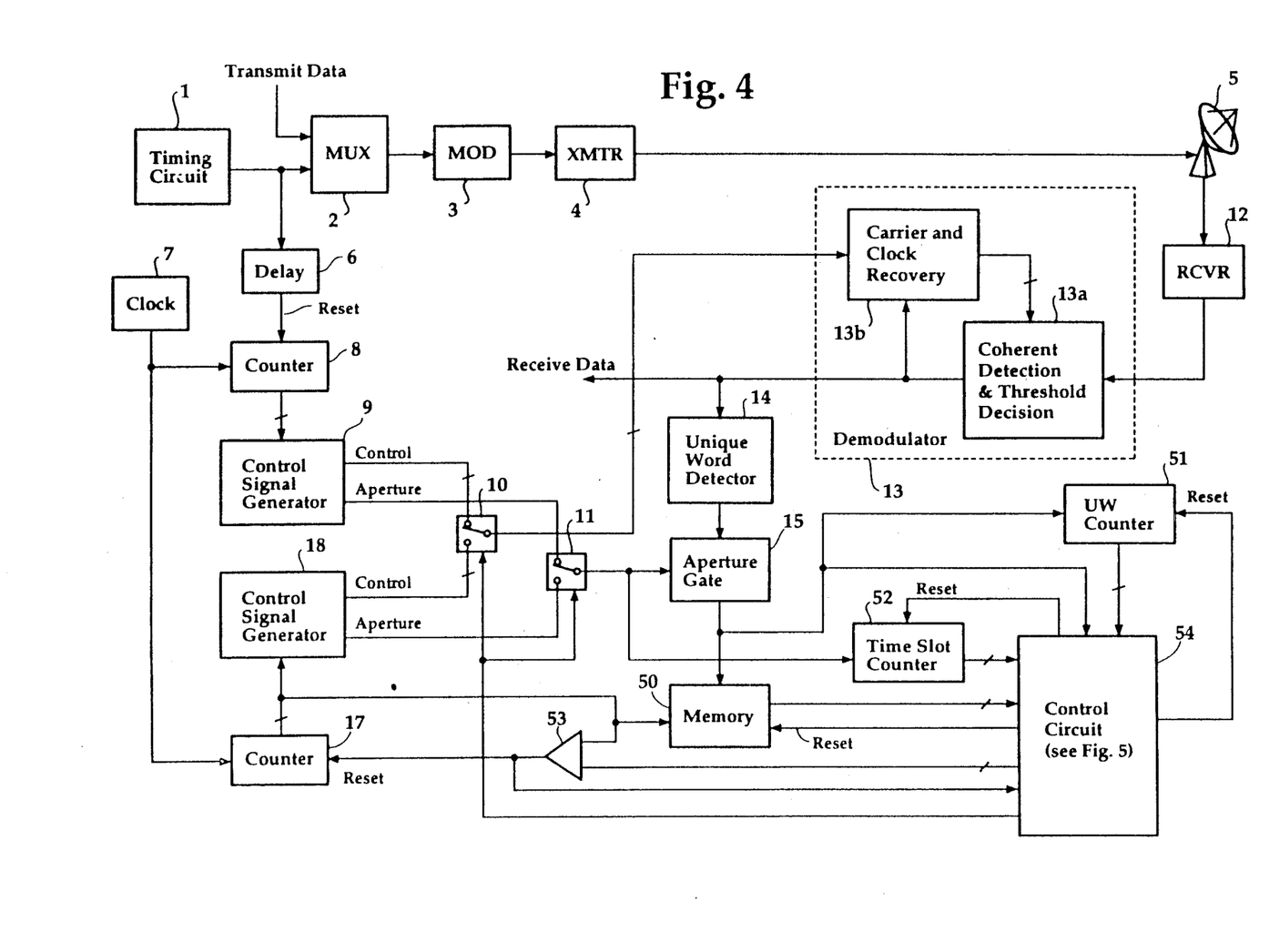
FIG. 4 is a block diagram of a further modification of the present invention.

FIG. 4 is a block diagram of a further embodiment of the present invention. In this embodiment, timing errors between successive incoming burst during narrow aperture modes are compensated for by deriving an average count corresponding to an average value of the guard times between successive bursts. In FIG. 4, the output of counter 17 is coupled to a memory 50 having a plurality of latches to successively store the binary count value of counter 17 in response to a unique-word detect pulse from aperture gate 15. The output of selector 11 is applied to a time slot counter 52 to provide a count of aperture gating pulses from either of the generators 9 and 18 to generate a signal representing the number of time slots, or bursts which the central station is expected to receive from the time the time slot counter 52 is reset. The output of aperture gate 15 is further applied to a unique word counter 51 which generates a signal indicative of the number of unique words detected from the time the counter 51 is reset. A control circuit 54 is provided to control the memory 50, time slot counter 52 and unique word counter 51 to obtain data therefrom and control the selectors 10 and 11 in a manner as described with reference to FIG. 5. The output of counter 17 is further applied to a comparator 53 which compares it with a reference binary count supplied from the control circuit 54 to produce an equality pulse when coincidence occurs between them. Control circuit 54 normally sets the reference count at the maximum value of the counter 17. The equality pulse is applied to the reset input of counter 17.

Figure 5:
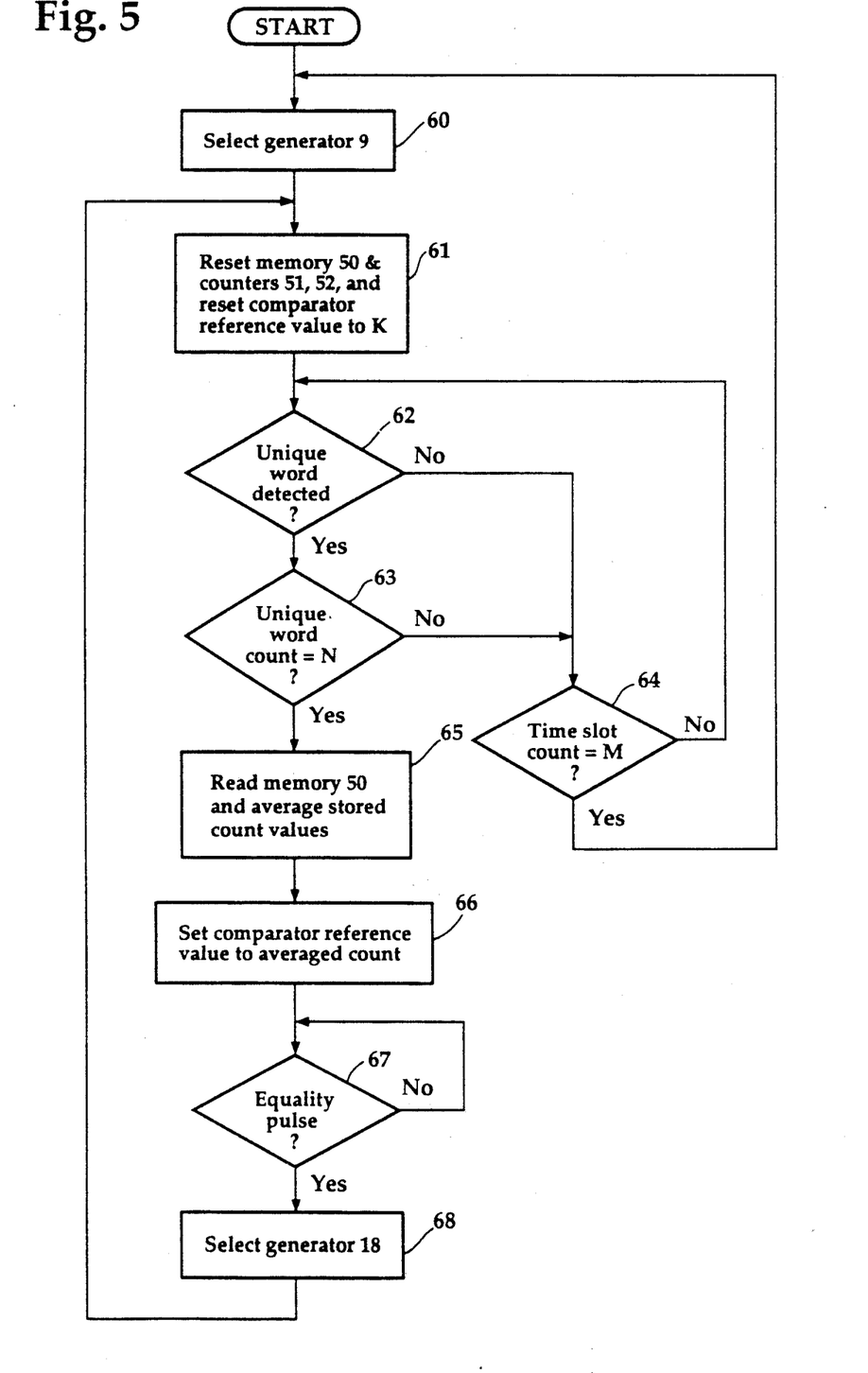
FIG. 5 is a flowchart describing the programmed steps performed by the control circuit of FIG. 4.

Control circuit 54 is a microprocessor-based controller which is programmed as shown in FIG. 5. The program execution starts with operations block 60 which directs the selecting of the control signal generator 9 by switching the selectors 10 and 11 to the upper position. Control exits to operations block 61 which directs the resetting of memory 50 and counters 51 and 52, so that all latches of the memory 50 are cleared and the counters 51 and 52 are initialized to zero. In addition, the reference count supplied to comparator 53 is reset to the maximum value K of counter 17. Exit then is to decision block 62 which checks to see if there is a pulse appearing at the output of aperture gate 15. If the answer is negative in decision block 62, control moves ahead to decision block 64 to check to see if the count provided by time slot counter 52 is equal to M or not. If the answer is negative in block 64, control returns to block 62, and if it is affirmative, control returns to block 60.

If the answer is affirmative in decision block 62, control advances to decision block 63 to check to see if the unique word count provided by counter 51 is equal to N which is smaller than M. If the answer is negative in block 63, control goes to decision block 64 to determine if the time slot count is equal to M. Therefore, if M time slots are counted by counter 52 before N unique words are detected while operating in a wide aperture mode, blocks 60 and 61 are executed again to select the generator 9 to continue the wide aperture mode and reset the memory 50 and counters 51 and 52.

If N unique words are detected before M time slots are counted during a wide aperture mode, an affirmative decision is made in block 63 and control proceeds to operations block 65 to read the contents of memory 50 which are latched successively therein in response to the detections of the N unique words and calculates the average value of the N binary counts of counter 17 which has been operating in a free-running mode. Since the guard times between successive incoming bursts tend to vary due to the variabilities of the operating parameters of the sending terminal stations, the binary counts attained by counter 17 at the instants a unique word is detected represent the deviations from the instant at which the counter 17 must be reset. Thus, the average value of the binary counts represents an average of the timing deviations of counter 17 from the reset instant which is optimum for receiving subsequent incoming bursts.

Control then proceeds to operations block 66 which directs the setting of the average value obtained by the step 65 as a reference value of comparator 53. If the current output of counter 17 is equal to the average count at the reference input of comparator 53, an equality pulse will be produced by comparator 54 without delay and resets the counter 17 immediately. If the current value of counter 17 is smaller than the average by two counts, for example, the timing of counter 17 will be delayed by two counts, and if it is larger than the average by the same amount, the timing of counter 17 will be delayed by (K-2) counts, i.e., advanced by two counts.

Exit then is to decision block 67 which tests whether an equality pulse is produced by comparator 53. When this pulse is generated, control proceeds to operations block 68 to select the generator 18 by switching the selectors 10 and 11 to the lower position. Control now returns to block 50 to reset the memory 50, counters 51, 52 and reset the comparator's reference count to the maximum value K.

Thereafter, the demodulator operates with a narrow aperture mode. Since counter 17 is synchronized precisely with the timing of the average value of guard times between successive incoming bursts, the unique words of the subsequent incoming bursts will be correctly gated through the narrowed aperture gate 15. If (N-1) unique words are subsequently detected by the narrowed aperture gate 15, control will loop through blocks 62, 63 and 64 and counter 17 is reset at the maximum value K. Therefore, the timing of counter 17 is corrected at every N incoming bursts to the average value of guard times between such incoming burst.

If, during the narrow aperture mode, the number of time slots becomes equal to M before N unique words are detected due to disruption or loss of incoming bursts, control exits from the loop of blocks 62, 63 and 64 and returns to block 60 to switch the selectors 10 and 11 to the upper position and so the demodulator operates in a wide aperture, or initial mode again for receiving a burst which may be affected by a large satellite drift in its position.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A satellite communications system having a central earth station and a plurality of terminal earth stations establishing a satellite channel with the central earth station via a geosynchronous satellite, the central earth station transmitting a time slot assignment signal and a reference timing signal to the terminal stations via the satellite channel to allow the terminal earth stations to send bursts on time slots specified by the assignment signal and establish a timing reference for timing said bursts, the central station including burst detector means for detecting said bursts from the terminal stations, a carrier and clock recovery circuit for recovering a carrier and clock pulses from the output of the detector means, and a unique word detector for detecting a unique word contained in the burst detected by the burst detector means and generating an output signal representative of the presence of a unique word, the central earth station comprising;
    timing means for generating a local timing signal synchronously with said reference timing signal;
    delay means for introducing a delay to the local timing signal by an amount corresponding to a minimum round-trip propagation delay of the satellite communications system;
    first control means responsive to said delayed local timing signal for generating a first control signal to recover said carrier and clock pulses, and generating a wide aperture gating pulse;
    second control means responsive to a reset pulse applied thereto for generating a second control signal to recover said carrier and clock pulses, and generating a narrow aperture gating pulse; and
    aperture control means for initially applying said first control signal to said carrier and clock recovery circuit and allowing said second control means to respond to an output signal from the unique word detector as said reset pulse during the wide aperture gating pulse of first occurrence; applying the second control signal to the carrier and clock recovery circuit and allowing the second control means to respond to a unique word detector output signal during the narrow aperture gating pulse of first occurrence if a unique word is present during the wide aperture gating pulse of the first occurrence and continuously applying the second control signal to the carrier and clock recovery circuit and continuously allowing the second control means to respond to a unique word detector output signal as said reset pulse during the narrow aperture gating pulse of subsequent occurrence if a unique word is present during the narrow aperture gating pulse of the first occurrence; and applying the first control signal to the carrier and clock recovery circuit and allowing the second control means to respond to a unique word detector output signal as said reset pulse during the wide aperture gating pulse of subsequent occurrence if a unique word is not present during at least one of the narrow aperture gating pulses of successive occurrences.

2. A satellite communication system as claimed in claim 1, wherein said first control means comprises:
    first counter means for incrementing a binary count at clock intervals, said first counter means being resettable to an initial value at time-slot intervals and further resettable to said initial value in response to the delayed timing signal; and
    first control signal generator means responsive to the binary count of the first counter means for generating said first control signal for controlling said carrier and clock recovery circuit for recovering said carrier and clock pulses and for generating a wide aperture gating pulse;
    wherein said second control means comprises:
    second counter means for incrementing a binary count at clock intervals, said second counter means being resettable to an initial value at said time-slot intervals and further resettable to the initial value in response to said reset pulse; and
    second control signal generator means responsive to the binary count of the second counter means for generating said second control signal for controlling said carrier and clock recovery circuit to recover said carrier and clock pulses and for generating said narrow aperture gating pulse;
    wherein said aperture control means comprises:
    an aperture gate connected to the output of said unique word detector for applying an output signal from said unique word detector to said second counter means as said reset pulse in the presence of an aperture gating pulse applied thereto;
    selector means having a first position for coupling said first control signal to said carrier and clock recovery circuit and coupling said wide aperture gating pulse to said aperture gate and a second position for coupling said second control signal to said carrier and clock recovery circuit and coupling said narrow aperture gating pulse to said aperture gate; and
    control means for initially switching said selector means to said first position, switching the selector means to the second position in response to an output signal from said aperture gate, and switching the selector means back to said first position when no unique word detector output signal appears subsequently at the output of said gate.

3. A satellite communications system as claimed in claim 2, wherein said control means comprises:
    a flip-flop responsive to the output of said aperture gate for assuming a first binary state; and
    means for switching said flip-flop to a second binary state in response to either of said wide or narrow aperture gating pulse at the output of said selector means, said selector means being responsive to the binary states of said flip-flop.

4. A satellite communications system as claimed in claim 3, wherein said switching means comprises a counter resettable in response to said reset pulse for counting aperture gating pulses at the output of said selector means and resetting said flip-flop when the count of said gating pulses reaches a predetermined value.

5. A satellite communication system as claimed in claim 1, wherein said first control means comprises:
first counter means for incrementing a binary count at clock intervals, said first counter means being resettable to an initial value at time-slot intervals and further resettable to said initial value in response to the delayed timing signal; and
first control signal generator means responsive to the binary count of the first counter means for generating said first control signal for controlling said carrier and clock recovery circuit to recover said carrier and clock pulses and for generating said wide aperture gating pulse;
said second control means comprises;
second counter means for incrementing a binary count at clock intervals, said second counter means being resettable to an intial value at said time-slot intervals and further resettable to the initial value in response to said reset pulse; and
second control signal generator means responsive to the binary count of the second counter means for generating said second control signal for controlling said carrier and clock recovery circuit to recover said carrier and clock pulses and for generating said narrow aperture gating pulse;
said aperture control means comprises:
an aperture gate connected to the output of said unique word detector for gating an output signal from said unique word detector in the presence of an aperture gating pulse applied thereto;
selector means having a first position for coupling said first control signal to said carrier and clock recovery circuit and coupling said wide aperture gating pulse to said aperture gate and a second position for coupling said second control signal to said carrier and clock recovery circuit and coupling said narrow aperture gating pulse to said aperture gate, said selector means initially assuming said first position;
memory means having a plurality of storage locations for storing the binary count of the second counter means into one of the locations in response to an output signal from said aperture gate;
unique word counter means for counting an output signal of said aperture gate to produce a count representing the number of unique words that occur during a period defined either by said wide or narrow aperture gating pulse;
comparator means for generating an equality pulse when the binary count of the second counter means equals a reference value and applying the equality pulse to said second counter means as said reset pulse, said reference value being normally set at a maximum count value of said second counter means; and
control means for deriving an average value of the binary counts store in said memory means when said unique word representative count reaches a predetermined value, setting said average value as said reference value of said comparator means, and causing said selector means to assume said second position when said equality pulse is generated by said comparator means.

6. A satellite communications system as claimed in claim 5, further comprising time slot counter means for counting the aperture gating pulses supplied to said aperture gate to produce a count representing the number of time slots, wherein said control means causes said selector means to assume said first position when said time slot representative count reaches a second predetermined value before said unique word representative count reaches the first-mentioned predetermined value, said second predetermined value being greater said first predetermined value.

7. In a satellite communications system having a central earth station and a plurality of terminal earth stations establishing a satellite channel with the central earth station via a geosynchronous satellite, the central earth station transmitting a time slot assignment signal and a reference timing signal to the terminal stations via the satellite channel to allow the terminal earth stations to send bursts on time slots specified by the assignment signal and establish a timing reference for timing said bursts, the central station including burst detector means for detecting said bursts from the terminal stations, a carrier and clock recovery circuit for recovering a carrier and clock pulses from the output of the detector means, and a unique word detector for detecting a unique word contained in the burst detected by the burst detector means and generating an output signal representative of the presence of a unique word, a method comprising the steps of:
a) generating a local timing signal in synchronism with said reference timing signal;
b) introducing a delay to the local timing signal by an amount corresponding to a minimum round-trip propagation delay of the satellite communications system;
c) applying a control signal to the carrier and clock recovery circuit in response to the delayed timing signal to recover said carrier and clock pulses and detecting a unique word detector output signal through a wide-open window;
d) applying said control signal to the carrier and clock recovery circuit in response to the detection of a unique word by the step (c) to recover said carrier and clock pulses and searching for a unique word detector output signal through a narrow window; and
e) repeating the step (c) if a unique word is not detected by the step (d) and repeating the step (d) if a unique word is detected by the step (d).

8. In a satellite communications system having a central earth station and a plurality of terminal earth stations establishing a satellite channel with the central earth station via a geosynchronous satellite, the central earth station transmitting a time slot assignment signal and a reference timing signal to the terminal stations via the satellite channel to allow the terminal earth stations to send bursts on time slots specified by the assignment signal and establish a timing reference for timing said bursts, the central station including burst detector means for detecting said bursts from the terminal stations, a carrier and clock recovery circuit for recovering a carrier and clock pulses from the output of the detector means, and a unique word detector for detecting a unique word contained in the burst detected by the burst detector means and generating an output signal representative of the presence of a unique word, a method comprising the steps of:
a) generating a local timing signal in synchronism with said reference timing signal;
b) introducing a delay to the local timing signal by an amount corresponding to a minimum round-trip propagation delay of the satellite communications system;
c) applying a control signal to the carrier and clock recovery circuit in response to the delayed timing signal to recover said carrier and clock pulses and detecting a unique word detector output signal through a wide-open window;
d) incrementing a binary count at clock intervals;
e) storing said binary count into a memory in response to the detection of a unique word detector output signal;
f) counting the detected unique word detector output signals;
g) if the count given by the step (f) reaches a predetermined value, deriving an average value of the binary counts stored in the memory;
h) comparing the binary count of the step (d) with the average value;
i) if the binary count of the step (d) is equal to the average value, applying said control signal to the carrier and clock recovery circuit to recover said carrier and clock pulses and searching for a unique word detector output signal through a narrow window; and
j) repeating the steps (c) to (i) if a unique word is not detected by the step (i) and repeating the steps (f) to (i).

9. A method as claimed in claim 8, wherein the step (g) further comprises the steps of:
G1) counting time slots;
G2) if the count given by the step (f) is smaller than said predetermined value, comparing the count of the time slots with a threshold value;
G3) if the count of the time slots is smaller than the threshold value, repeating the steps (h) to (j); and
G4) if the count of the time slots is equal to the threshold value, repeating the steps (c) to (j).

* * * * *